US010544295B2

(12) United States Patent
Heemann et al.

(10) Patent No.: US 10,544,295 B2
(45) Date of Patent: Jan. 28, 2020

(54) COVERING MATERIALS FOR ADHESIVE HOT-MELT GLUES

(71) Applicant: HENKEL AG & CO. KGAA, Duesseldorf (DE)

(72) Inventors: Marcus Heemann, Neuss (DE); Sebastian Kostyra, Monheim (DE); Eckhard Puerkner, Duesseldorf (DE); Gerald Petry, Hueckelhoven (DE); Riju Davis, Schwabmuenchen (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 178 days.

(21) Appl. No.: 15/701,538

(22) Filed: Sep. 12, 2017

(65) Prior Publication Data
US 2017/0369690 A1 Dec. 28, 2017

Related U.S. Application Data

(63) Continuation of application No. PCT/EP2016/055018, filed on Mar. 9, 2016.

(30) Foreign Application Priority Data

Mar. 12, 2015 (DE) .................. 10 2015 204 468

(51) Int. Cl.
C08L 23/12 (2006.01)
B29C 48/04 (2019.01)
B29B 9/12 (2006.01)
C08L 23/08 (2006.01)
B29B 9/16 (2006.01)
B29K 105/00 (2006.01)

(52) U.S. Cl.
CPC ............... C08L 23/12 (2013.01); B29B 9/12 (2013.01); B29C 48/04 (2019.02); C08L 23/0807 (2013.01); B29B 2009/163 (2013.01); B29K 2105/0097 (2013.01); C08J 2423/08 (2013.01); C08L 2203/16 (2013.01); C08L 2314/06 (2013.01)

(58) Field of Classification Search
CPC .................................. B29C 48/04; C08L 23/12
See application file for complete search history.

(56) References Cited

U.S. PATENT DOCUMENTS

| 3,896,069 | A | 7/1975 | Kosaka et al. |
| 5,378,089 | A | 1/1995 | Law |
| 6,143,206 | A | 11/2000 | Handa et al. |
| 6,238,732 | B1 | 5/2001 | Cameron et al. |
| 6,430,898 | B1 | 8/2002 | Remmers et al. |
| 6,669,986 | B1 | 12/2003 | Mushiake et al. |
| 6,716,527 | B1 | 4/2004 | Czmok et al. |
| 6,872,279 | B1 | 3/2005 | Kolowrot et al. |
| 7,268,178 | B2 | 9/2007 | Frei |
| 2003/0190467 | A1 | 10/2003 | Husemann et al. |
| 2005/0106978 | A1* | 5/2005 | Cheng ........................ B32B 5/24 442/327 |
| 2006/0093764 | A1 | 5/2006 | Mehta et al. |
| 2006/0293453 | A1* | 12/2006 | Jiang ...................... C08F 210/06 525/191 |
| 2008/0190541 | A1* | 8/2008 | Terfloth ............. C09J 123/0815 156/60 |
| 2009/0270540 | A1 | 10/2009 | Tonniessen et al. |
| 2009/0306281 | A1 | 12/2009 | Tancrede et al. |
| 2012/0149827 | A1* | 6/2012 | Hu ......................... C09J 123/02 524/505 |
| 2013/0143997 | A1* | 6/2013 | Burgsmueller ........... B29B 9/12 524/478 |
| 2013/0171901 | A1* | 7/2013 | Bartl ......................... C09J 5/06 442/291 |

FOREIGN PATENT DOCUMENTS

| CA | 1267517 A | 4/1990 |
| CN | 103540279 A | 1/2014 |
| CN | 104334618 A | 2/2015 |
| EP | 0451920 A2 | 10/1991 |
| EP | 0469564 A1 | 2/1992 |
| EP | 0557573 A2 | 9/1993 |
| EP | 0957029 A1 | 11/1999 |
| JP | 2002509944 A | 4/2002 |
| JP | 2002338933 A | 11/2002 |
| JP | 2004314516 A | 11/2004 |
| JP | 2005199706 A | 7/2005 |
| WO | 2006050108 A1 | 5/2006 |
| WO | 2014194087 A2 | 12/2014 |

OTHER PUBLICATIONS

Optimization of temperatures across extruder is essential to reduce stress to polymer melt. Plastemart. http://www.plastemart.com/upload/literature/optimization-of-temperatures-extruder-reduce-stress-polymer-meltasp.

LDPE. Polymers: A property Database. CHEMnetBASE, http://www.chemnetbase.com/. CRC Press, Taylor and Francis Group, LLC.

* cited by examiner

Primary Examiner — Irina Krylova
(74) Attorney, Agent, or Firm — Sun Hee Lehmann

(57) ABSTRACT

The invention relates to a nontacky film-forming polymer composition (cover material), and tacky hot melt adhesives in the form of pellets which are coated with the polymer composition and producible by coextruding the hot melt adhesive and the cover material. The film-forming composition comprises 5 to 40% by weight of at least one Fischer-Tropsch wax having a melting point of >95° C. and 30 to 70% by weight of at least one metallocene-catalyzed polyolefin having a softening point of >95° C. and a melt flow index (MFI) (230° C., 2.16 kg) of ≤1000 and ≥300 g/10 minutes. The invention further relates to suitable uses for such hot melt adhesives, methods for their use, and products containing these adhesives.

6 Claims, 1 Drawing Sheet

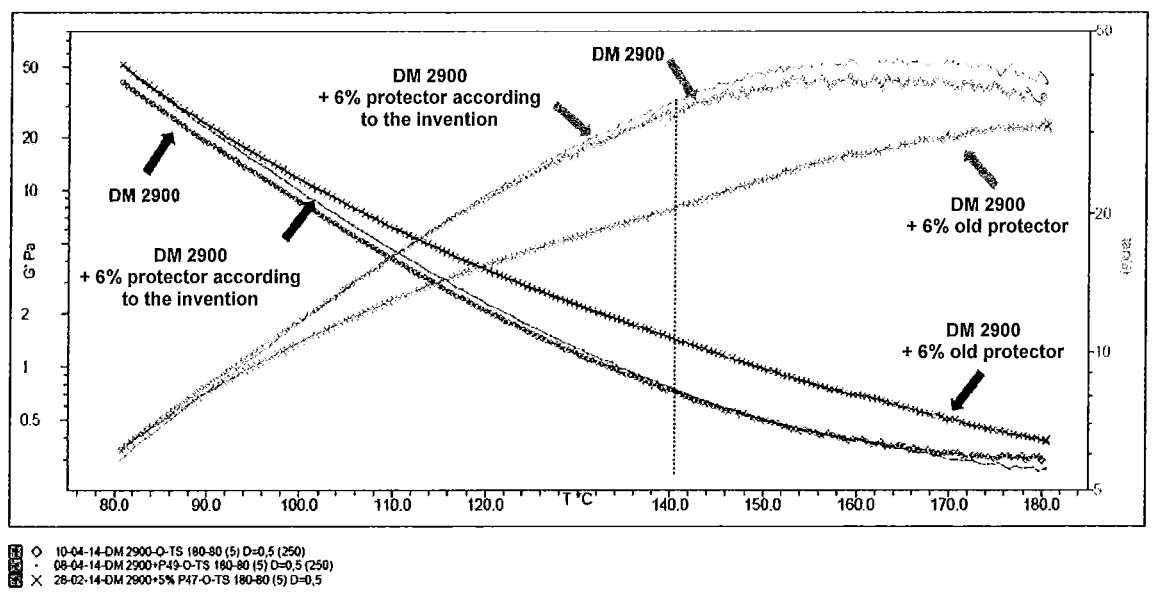

COVERING MATERIALS FOR ADHESIVE HOT-MELT GLUES

FIELD OF THE INVENTION

The invention relates to hot melt adhesives in the form of pellets which have a hot melt adhesive core that is tacky, and which are coated with a specialized nontacky cover material made of a polymeric film, and are manufacturable by coextrusion of the hot melt adhesive core and the cover material. The resulting hot melt adhesive pellets, due to their small size and the low or nonexistent surface tackiness, are suited for automatic dosing systems for the end user, and are also characterized in that the cover material does not adversely affect the properties of the resulting hot melt adhesive, in particular its processability, has good barrier properties with respect to low-molecular components of the hot melt adhesive core, and is based on raw materials that are approved for the end use, for example for the packaging of foods. In addition, suitable uses for these types of hot melt adhesives, methods for their use, and products containing these adhesives are described.

BACKGROUND OF THE INVENTION

Hot melt adhesives that are coated with a nontacky film-forming material (cover material) are known from US 2013/0143997 A1, for example. These types of hot melt adhesives in pellet form have the advantage that the surface coating prevents the individual hot melt adhesive pellets from sticking together during manufacture, transport, and storage, the pellet form allowing simple dosing and handling.

However, the known cover materials have the disadvantage that they have a great impact on the processability of the resulting hot melt adhesive pellets, for example by altering the theological properties in such a way that for processing the hot melt adhesive via nozzle systems (sprayability), much higher temperatures, typically temperatures that are higher by approximately 20 K, are necessary than for the adhesive without cover material.

SUMMARY OF THE INVENTION

The object, therefore, is to provide improved polymer compositions that are suitable as cover material, and which on the one hand allow the manufacture, transport, and storage of tacky hot melt adhesives in granular form that can be dosed in an automated manner, and which on the other hand during melting are homogeneously miscible with the hot melt adhesive core, and do not adversely affect its processing properties. These types of polymer compositions therefore advantageously have the following properties:
- low-tack or nontacky surface
- compatibility (including homogeneous miscibility) with the hot melt adhesive to be coated
- little or no adverse effect on the processability of the hot melt adhesive
- good barrier properties with respect to low-molecular components of the hot melt adhesive, such as plasticizer oils
- based on raw materials that are approved for the end use, for example in the food packaging sector.

This object is achieved by the present invention by providing a polymer composition that is compatible with olefin-based contact adhesives and has all of the properties stated above. In particular, the invention allows processing of the hot melt adhesive pellets via nozzle systems (i.e., spraying) without limitations or adaptations compared to the hot melt adhesive without the cover material in question.

In a first aspect, the present invention therefore relates to a polymer composition which, based on its total weight, comprises:
a) 5 to 40% by weight, in particular 10 to 20% by weight, of at least one Fischer-Tropsch wax having a melting point >95° C.;
b) 30 to 70% by weight, in particular 40 to 65% by weight, of at least one metallocene-catalyzed polyolefin, in particular polypropylene, having a softening point >95° C. and a melt flow index (MFI) (230° C., 2.16 kg) of ≤1000 and ≥300 g/10 minutes;
c) 0 to 65% by weight, in particular 20 to 40% by weight, of at least one metallocene-catalyzed polyolefin, in particular polypropylene, having a softening point >85° C. and a melt flow index (MFI) (230° C., 2.16 kg) of >1000 g/10 minutes;
d) 0 to 40% by weight of at least one metallocene-catalyzed polyolefin, in particular polypropylene, having a softening point >115° C. and a melt flow index (MFI) (230° C., 2.16 kg) of <300 g/10 minutes;
e) 0 to 60% by weight of at least one polyolefin, in particular a metallocene-catalyzed polyolefin, that is different from b) through d), having a molecular weight $M_n$<140,000 g/mol; and
f) 0 to 20% by weight of additives and supplements selected from antioxidants, stabilizers, plasticizers, other polymers, or a combination thereof.

In a further aspect, the invention relates to a hot melt adhesive in the form of a pellet, comprising:
(1) a core made of a hot melt adhesive having a softening point of 65 to 140° C., containing at least one polyolefin and at least one tackifying resin; and
(2) a film made of a polymer composition according to the invention, which essentially completely coats the core and is preferably nontacky at a temperature of 20° C. to 60° C.

Further aspects of the invention relate to the use of the hot melt adhesive pellets described herein as contact adhesives, for example for adhesively bonding substrates in the form of a film to nonwovens, and a method for feeding a melting device with a hot melt adhesive, comprising supplying one or more hot melt adhesive pellets as described herein to the melting device by means of a conveying device, in particular a vacuum conveying device.

BRIEF DESCRIPTION OF THE FIGURES

FIG. 1 is a rheology curve, G' and tan δ vs. Temperature of the inventive and conventional hot melt adhesive.

DETAILED DESCRIPTION OF THE INVENTION

Unless indicated otherwise, the molecular weights given in the present text refer to the number average molecular weight ($M_n$). Unless indicated otherwise, all stated molecular weights refer to values that are obtainable by gel permeation chromatography (GPC). Polystyrenes are used as reference.

"At least one" as used herein means 1 or more, i.e., 1, 2, 3, 4, 5, 6, 7, 8, 9, or more. With regard to an ingredient, the indication refers to the type of ingredient and not to the absolute number of molecules. "At least one polymer" thus means, for example, at least one type of polymer; i.e., one type of polymer or a mixture of multiple different polymers may be used. Together with weight indications, the statement refers to all compounds of the indicated type that are contained in the composition/mixture; i.e., the composition contains no further compounds of this type besides the indicated quantity of the compounds in question.

According to the present invention, the term "essentially" corresponds to 97%, preferably 98%, more preferably 99%, most preferably 100%, of the particular value to which it refers. For example, "essentially completely coated" is understood to mean that at least 97% of the core made of the tacky hot melt adhesive is coated by the film of the polymer composition of the present invention.

Unless explicitly indicated otherwise, all stated percentages used in conjunction with the compositions described herein refer to % by weight, in each case based on the mixture in question.

"Approximately," as used herein with regard to a numerical value, refers to the numerical value ±10%, preferably ±5%.

The melting point as used herein may be determined by differential scanning calorimetry (DSC) according to ISO 11357-3:2011. Unless indicated otherwise, the values described herein refer to the values that are determined using this method.

The softening point as used herein may be determined by the ring and ball method according to ISO 4625-1:2004. Unless indicated otherwise, the values described herein refer to the values that are determined using this method.

The melt flow index (MFI) as used herein may be determined by the method according to DIN EN ISO 1133 or ASTM D1238 at a test temperature of 230° C. and a test weight of 2.16 kg. Unless indicated otherwise, the values described herein refer to the values that are determined using this method.

The term "pellet" as used herein includes small bodies of the hot melt adhesive having a symmetrical or asymmetrical shape and a weight of up to 15 g, preferably up to 10 g, more preferably up to 5 g. The maximum size of the pellets is 25 mm, preferably up to 20 mm, in all directions, preferably in the largest extension, and at least 1 mm, preferably 3 mm, in the direction of the smallest extension. The shape of the pellets may vary, depending on the manufacturing process. Thus, the pellets may be pillow-shaped, for example with dimensions of approximately 15 mm×5 mm×5 mm, approximately spherical, for example ball-shaped, optionally with a diameter of 10 to 20 mm, or cylindrical, for example with a length of 25 mm and a diameter of 2 to 10 mm. The shape does not have to be uniform, so that spherical shapes may be compressed or stretched, for example. The pellets may be a mixture of pellets having different shapes; however, it is preferred that they all have approximately the same shape. Smaller pellets typically have better flow properties.

The polymer composition and the hot melt adhesive pellets according to the invention are nontacky at the surface. In this regard, according to the present invention "nontacky" is defined as "free-flowing" at a temperature of 20 to 60° C. "Free-flowing" means that at the stated temperature (20 up to 60° C.), a fairly large quantity of the hot melt adhesive pellets or of the polymer composition (likewise as pellets) flows under the influence of gravity through a vertical tube having a diameter of 10 cm and a length of 50 cm, with no observed sticking, clumping, or clogging of the tube. This property should be retained even after extended storage at elevated temperature. This is tested as follows: A metal or plastic tube having a 10-cm diameter is filled up to a height of 10 cm with the pellets (preferably in each case in a quantity of 15 mm×5 mm×5 mm). A plate weighing 500 g is then placed on the pellets, and the test device is kept in an oven at 60° C. or 20° C. for 7 days. After this time, the pellets are cooled to 20° C., if necessary, and tested for their flow properties using the above-described method (pouring into a vertical tube having a diameter of 10 cm and a length of 50 cm).

The film-forming nontacky polymer compositions of the invention, also referred to herein as "cover material," "film-forming polymer compositions," or "film-forming composition," contain at least one wax, which is a Fischer-Tropsch wax having a melting point of greater than 95° C. Fischer-Tropsch waxes as used herein are synthetic waxes that are composed of hydrocarbons and produced using the Fischer-Tropsch method. In various embodiments the waxes are synthetic paraffins. These waxes, in contrast to products originating from mineral oil, are composed predominantly of unbranched n-alkanes.

The waxes are used in the polymer compositions in quantities of 5 to 40% by weight, preferably 10 to 20% by weight, particularly preferably 13 to 17% by weight, more preferably approximately 15% by weight, in each case based on the total weight of the composition.

Furthermore, the film-forming compositions contain at least one polyolefin that is obtainable by means of metallocene-catalyzed polymerization. The monomers used for producing the polyolefin are in particular propylene; i.e., the polyolefin in various embodiments is a polypropylene. Alternatively, however, ethylene or known $C_4$ to $C_{20}$ olefin monomers that are copolymerizable with ethylene or propylene may also be used. The copolymerizable monomers are in particular linear or branched $C_4$ to $C_{20}$ olefins, also referred to as α-olefins, such as butene, hexene, methylpentene, octene; cyclically unsaturated compounds such as norbornene or norbornadiene; symmetrically or asymmetrically substituted ethylene derivatives, wherein $C_1$ to $C_{12}$ alkyl functional groups are suitable as substituents; and optionally unsaturated carboxylic acids or carboxylic acid anhydrides. In general, the polyolefins used according to the invention may be homopolymers, copolymers, or terpolymers, which may also contain further monomers. However, homopolymers, in particular polypropylene homopolymers, are preferred.

An important property of the polyolefins used in the cover material is their viscosity. Since meltable compounds are used as the melts, the viscosity is stated measured as the MFI. The polyolefins used according to the invention have a softening point of >95° C. (ISO 4625) and an MFI between 300 and 1000 g/10 minutes (measured at a temperature of 230° C. and a test weight of 2.16 kg according to ISO 1133). In preferred embodiments, the MFI is between 350 and 1000 g/10 minutes or between 400 and 1000 g/10 minutes. The molecular weight of these polyolefins is typically less than 100,000 g/mol, in particular less than 90,000 g/mol, very particularly preferably less than 80,000 g/mol. The lower limit is 50,000 g/mol (number average molecular weight, as determinable by GPC). These polymers are characterized in that they have a narrow molecular weight distribution. Such polymers are known in the literature, and are commercially available from various manufacturers. One suitable polymer is available under the trade name L-Modu™ S600 (Idemitsu Kosan Co., Ltd.), for example. This polyolefin has an MFI of 350, a molecular weight of 70,000 g/mol, and a softening point of 100° C.

The polyolefin having a softening point of >95° C. of the polymer composition is used in quantities of 30 to 70% by weight, preferably 40 to 65% by weight, more preferably 55 to 65% by weight.

In addition to the polyolefin described above, further polyolefins that are obtainable by metallocene catalysis may be used. "Metallocene catalysis" or "metallocene-catalyzed polymerization," as used interchangeably herein, refers to the polymerization of olefins that is catalyzed using metallocenes as catalyst. Highly isotactic polypropylene, for example, may be produced in this way.

In preferred embodiments, in addition to the polyolefin described above it is possible to use, for example, a polyolefin that is obtainable by means of metallocene catalysis and has a softening point >85° C. and a melt flow index (MFI) (230° C., 2.16 kg) of >1000 g/10 minutes. The polyolefin may be as defined above, but preferably is a polypropylene. The molecular weight of these polyolefins is typically less than 50,000 g/mol (number average molecular weight, as determinable by GPC). These polyolefins are preferably used in quantities of 0 to 65% by weight, more preferably 20 to 40% by weight, particularly preferably 22 to 27% by weight, most preferably approximately 25% by weight, in each case based on the polymer composition. One suitable polymer is available under the trade name L-Modu™ S400 (Idemitsu Kosan Co., Ltd.), for example. This polyolefin has an MFI of approximately 2000, a molecular weight of 45,000 g/mol, and a softening point of 90° C.

In preferred embodiments, in addition to the polyolefin or polyolefins described above, it is possible to use, for example, a polyolefin that is obtainable by means of metallocene catalysis and has a softening point >115° C. and a melt flow index (MFI) (230° C., 2.16 kg) of >300 g/10 minutes. The polyolefin may be as defined above, but preferably is a polypropylene. The molecular weight of these polyolefins is typically greater than 100,000 g/mol but less than 200,000 g/mol (number average molecular weight, as determinable by GPC). These polyolefins are preferably used in quantities of 0 to 40% by weight, based on the polymer composition. One suitable polymer is available under the trade name L-Modu™ S901 (Idemitsu Kosan Co., Ltd.), for example. This polyolefin has an MFI of approximately 50, a molecular weight of 120,000 g/mol, and a softening point of 120° C.

Additional polymers that may be contained in the film-forming polymer compositions may include further polyolefins, for example at least one metallocene-catalyzed polyolefin, having a molecular weight $M_n$<140,000 g/mol. These polymers may be contained in the cover material in quantities of 0 to 60% by weight, based on the total weight of the cover material.

The film-forming compositions used as cover material according to the invention may also contain 0 to 20% by weight additives and auxiliaries, known per se in the prior art. Such additives and supplements are selected in particular from antioxidants, stabilizers, plasticizers, other polymers, or a combination thereof.

Suitable plasticizers are described below, and include in particular hydrocarbon oils such as paraffin oils, naphthenic oils, and/or mineral oils, and poly(iso)butylene. The plasticizers may contribute to obtaining a homogeneous mixture of the film-forming polymer composition and the hot melt adhesive core during melting and use of the hot melt adhesive pellets.

In various embodiments, the film-forming composition contains a) 10 to 20% by weight, in particular 13 to 17% by weight, of at least one Fischer-Tropsch wax having a melting point >95° C.;
b) 40 to 65% by weight, in particular 55 to 65% by weight, of at least one metallocene-catalyzed polyolefin, in particular polypropylene, having a softening point >95° C. and a melt flow index (MFI) (230° C., 2.16 kg) of 1000 and 300 g/10 minutes;
c) 20 to 40% by weight, in particular 22 to 27% by weight, of at least one metallocene-catalyzed polyolefin, in particular polypropylene, having a softening point >85° C. and a melt flow index (MFI) (230° C., 2.16 kg) of >1000 g/10 minutes; and
d) 0 to 2% by weight, in particular 0.5% by weight, of an antioxidant agent.

In preferred embodiments of the invention, the film-forming material has a melting point of <130° C.

The core material is described in greater detail below.

The core material of the hot melt adhesives of the present invention contains at least one thermoplastic polymer, in particular at least one polyolefin, and at least one tackifying resin. The polymers used are preferably nonreactive. Due to the use of the tackifying resin, a hot melt adhesive is obtained that has tackiness of the surface at 25° C.

Examples of suitable polymers include, without being limited thereto, polyethylene, polypropylene, and copolymers thereof as well as amorphous poly-α-olefins (APAO).

In various embodiments of the invention, the base polymers of the hot melt adhesive composition (core material) are selected from polyolefins, polyolefin copolymers, or polyolefin/alpha-olefin interpolymers, as well as amorphous poly-alpha-olefins such as atactic propylene and propylene copolymers with ethylene, butene, hexane, and octane, or ethylene or propylene homopolymers or copolymers and mixtures of the polymers mentioned above.

The above-described polymers are known for use in tacky hot melt adhesives, and are commercially available in different compositions and molecular weights. Those skilled in the art in this field may easily select suitable thermoplastic polymers with regard to the melting point, viscosity, and adherence, among other properties, depending on the desired field of application.

The stated polymers are formulated in the tacky hot melt adhesives together with at least one tackifying resin and optionally also with at least one plasticizer.

The resin, which is intended to tackify the base polymer, is generally used in a quantity of 10 to 60% by weight, in particular 20 to 60% by weight, in each case based on the tacky hot melt adhesive composition, i.e., the core material of the hot melt adhesive according to the invention.

In principle, it is possible to use the known resins, for example aromatic, aliphatic, or cycloaliphatic hydrocarbon resins, in each case also in completely or partially hydrogenated form, as well as modified or hydrogenated natural resins. Suitable resins that are usable within the scope of the invention include, without being limited thereto, terpene resins such as terpolymers or copolymers of terpene, natural resins based on colophony resin or tall resin, including the derivatives thereof, for example the pentaerythrol or glycerol esters thereof, other modified natural resins such as resin acids from balsam resin, tall resin, or wood rosin, optionally also hydroabietyl alcohol and its esters, acrylic acid copolymers such as styrene-acrylic acid copolymers or copolymers of ethylene, acrylate esters, and maleic acid anhydride, or resins based on functional hydrocarbon resins. These are sometimes also usable as additives or supplements.

The at least one tackifying resin may be an individual resin, or preferably a resin mixture.

In various embodiments, the resin includes a completely or partially hydrogenated hydrocarbon resin and/or at least one natural resin based on colophony resin or tall resin or a pentaerythrol or glycerol ester thereof. The at least one completely or partially hydrogenated hydrocarbon resin may in particular include an aromatically modified resin, a polyterpene, a terpene phenolic resin, a 1,3-pentadiene resin, a cyclopentadiene resin, a 2-methyl-2-butene copolymer, or a derivative of the above-mentioned resins.

It is preferred that the tackifying resins have a softening point of approximately 80° C. to 150° C. (ring and ball method; ISO 4625 or ASTM E28-58).

Plasticizers are another component that may be contained in the hot melt adhesive of the core. These may be selected from mineral oils, poly(iso)butylene, liquid or pasty hydrogenated hydrocarbons, and low-molecular polyolefins. Suitable plasticizers include but are not limited to medicinal white oils, naphthenic mineral oils, polypropylene, polybutylene, and polyisoprene oligomers, hydrogenated polyisoprene and/or polybutadiene oligomers, benzoate esters, phthalates, adipates, plant or animal oils, and the derivatives thereof. Hydrogenated plasticizers are selected, for example, from the group of paraffinic hydrocarbon oils. Polypropylene glycol and polybutylene glycol as well as polymethylene glycol are also suitable. The molecular weight of polyalkylene glycols or polybutylene oligomers should preferably be in the range of 200 to 6000 g/mol, and polyolefins should have a molecular weight of up to approximately 2000 g/mol, in particular up to 1000 g/mol.

Esters may also be used as plasticizers, for example liquid polyester and glycerol esters such as glycerol diacetate, glycerol triacetate, neopentyl glycol dibenzoate, glycerol tribenzoate, pentaerythritol tetrabenzoate, and 1,4-cyclohexanedimethanol dibenzoate. Aromatic dicarboxylic acid esters, for example phthalic acid, isophthalic acid, or terephthalic acid esters, may also be used. Sulfonic acid esters or fatty acids are also usable as plasticizers.

In particular, white oils, mineral oils, poly(iso)butylene, and liquid or pasty hydrogenated hydrocarbons are preferred.

The quantity of plasticizers in the tacky hot melt adhesive should be between 0 and 25% by weight, in particular between 5 and 20% by weight. An excessively high proportion of plasticizers results in reduced cohesive properties of the adhesive.

Waxes may also optionally be added to the hot melt adhesive of the core in quantities of 0 to 20% by weight. The quantity is such that on the one hand the viscosity is lowered to the desired range, but on the other hand the adhesion is not adversely affected. The wax may be of natural origin, optionally also in chemically modified form, or of synthetic origin. Plant waxes and animal waxes, or mineral waxes or petrochemical waxes may be used as natural waxes. Hard waxes such as montan ester waxes, Sasol waxes, etc., may be used as chemically modified waxes. Polyalkylene waxes and polyethylene glycol waxes are used as synthetic waxes. Petrochemical waxes such as petrolatum, paraffin waxes, microcrystalline waxes, and synthetic waxes are preferably used. Paraffinic and/or microcrystalline waxes and/or hydrogenated versions thereof, in particular polypropylene wax or polyethylene wax, having a dropping point of 130 to 170° C. determined according to ASTM D-3954, are particularly preferred.

In addition to the above-mentioned components, the hot melt adhesives of the core according to the invention may contain even further components, typically used in hot melt adhesives, as additives. These include, for example, stabilizers, adhesion promoters, antioxidants, fillers, pigments, or combinations thereof. Certain properties of the adhesive such as cohesion, stability, adherence, or strength may be influenced in this way. The quantity of the additives and supplements may preferably be 0 to 3% by weight, typically 0.1 to 2% by weight. Particularly preferred additives include stabilizers against thermal and oxidative degradation, and degradation by UV radiation.

Additives such as stabilizers or adhesion promoters are known to those skilled in the art. These are commercial products, and are selectable by those skilled in the art, depending on the desired properties. It is important to ensure compatibility with the polymer mixture.

The hot melt adhesive is produced, using known methods, by mixing in the melt. All components may be provided at the same time, heated, and then homogenized, or initially the more easily melting components are provided and mixed, followed by addition of the other resin components. It is also possible and preferable to produce the hot melt adhesive continuously in an extruder. The suitable hot melt adhesive is solid and, except for impurities, essentially free of solvents.

The hot melt adhesive of the core preferably has a softening point (ring and ball, ASTM E 28) of 65 to 140° C., preferably up to 130° C., in particular less than 120° C.

The hot melt adhesive pellets are described in detail below.

In various embodiments, the film-forming polymer composition forms an essentially continuous film that essentially completely covers the hot melt adhesive core. This may be achieved by heating the film-forming composition for the application to above its melting temperature and then applying it in the molten state. The application preferably takes place by coextrusion. The two materials of the shell and of the core are preferably compatible in such a way that they form a stable, homogeneous mixture upon melting. In one embodiment of the invention, the shell material has a melting point that is the same as or lower than the melting point of the core material.

The film-forming polymer composition, as defined above, forms a coating or film that is preferably nontacky at a temperature of 20° C. up to 60° C. and protects the adhesive core from influences from the environment. During the application of the hot melt adhesive according to the invention in pellet form, it is molten, resulting in a homogeneous mixture of the shell material and core material. This process may be accelerated by mixing devices such as static or dynamic mixers, or by pumps. The resulting melt is a homogeneous contact adhesive, and is used/applied in this liquid form.

The polymeric film typically has a thickness in the range of 2 to 200 μm, in particular 10 to 100 μm, very particularly preferably approximately 20 μm. However, the thickness of the film also depends on the size of the pellets. The quantity of the polymeric film in the hot melt adhesive in pellet form is therefore generally up to 12% by weight, preferably 1 to 10% by weight, more preferably 3 to 8% by weight, particularly preferably 5 to 7% by weight, based on the total weight of the hot melt adhesive pellets.

As mentioned above, the pellet-form hot melt adhesives of the invention are preferably produced by coextrusion. In the coextrusion process, the hot melt adhesive or its components is/are melted in a mixing device and homogenized, and subsequently extruded through an extruder opening or nozzle. The nozzle may have any conventional shape, but typically has a slotted or circular opening through which the composition is pumped. The extruder nozzle is customarily held at a temperature above the melting point of the material, generally in the range of 80 to 150° C. During the coextrusion, the film-forming polymer composition is simultaneously extruded from the extruder nozzle, in particular in such a way that it essentially covers the core to be coated as a continuous film, thus essentially enclosing the hot melt adhesive. Such coextrusion processes and the devices used therein are known in the prior art.

In one preferred embodiment, the production takes place by forming the pellets with a nip roller in the cooling water in which the hot melt adhesive and the polymeric film are coextruded. The individual pellets are subsequently separated from one another in a centrifugal dryer. This is a method known to those skilled in the art.

After cooling, the pellets may be packaged in a container, a box, or a bag for transport. The container may be made of a mechanically stable material, so that transport and handling of large quantities of pellets are also possible.

The pellets are preferably nontacky at temperatures of 20° C. to 60° C., and may therefore be stored and transported without sticking together.

The hot melt adhesive pellets described herein are suited in particular as contact adhesives (pressure sensitive adhesives (PSAs)) and are used for this purpose. Fields of application, for example, are adhesive bonding of films to one another or to other substrates such as woven or nonwoven fabrics, for example in the manufacture of hygienic articles, in particular diapers. Products that are adhesively bonded using the hot melt adhesives of the invention are therefore likewise a part of the invention.

During use of the hot melt adhesive pellets of the invention, they are typically placed in fairly large containers, and in a first step are provided to a conveying device which then transports the pellets into the melting device. This conveying device may be screw conveyors, conveyor belts, or the like; however, the pellets are preferably transported by means of a gas stream, for example compressed air or negative pressure (vacuum). Since such conveying results in mechanical friction between the particle surfaces, here as well the coating prevents sticking and clumping in the conveying device. The invention therefore further relates to methods for feeding a melting device with a hot melt adhesive, comprising supplying a plurality of hot melt adhesive pellets according to the invention to the melting device by means of a conveying device, in particular a vacuum conveying device. After the pellets are melted in the melting device, the melt is then transported, typically pumped, to suitable dispensing devices, for example spray nozzles or rollers, via which they are applied to the substrate for which adhesive bonding is desired.

The hot melt adhesive pellets described herein may be used in automated methods for applying the hot melt adhesive of the hot melt adhesive pellets.

Since the pellets may have a comparatively small volume, they allow simple, targeted portioning, for example in a conveying device. The quantity of adhesive that is present in the melting device at the same time may thus be reduced, thus avoiding long melt times, overdosing, or long holding times in the melting device, which could result in degradation of the adhesive components.

The following examples are used to explain the invention; however, the invention is not limited thereto.

EXAMPLES

Example 1: Adhesive Formulation

Film-forming compositions were produced, containing the following components with regard to composition (in % by weight):

|  | Conventional coating | E1 | E2 | E3 | E4 |
|---|---|---|---|---|---|
| High-molecular polyethylene, MFI 155 | 59.5 | — | — | — | — |
| Synthetic paraffin wax | 20.0 | 15.0 | 15.0 | 15.0 | 20 |
| Metallocene-catalyzed PP, MFI 2000 | 20.0 | 44.5 | 34.5 | 24.5 | — |
| Metallocene-catalyzed PP, MFI 350 | — | 40.0 | 50.0 | 60.0 | 69.5 |
| Metallocene-catalyzed PP, MFI 50 | — | — | — | — | 10 |
| Antioxidant | 0.5 | 0.5 | 0.5 | 0.5 | 0.5 |
| Viscosity (mPas at 180° C.) | 17,120 | 14,240 | 17,200 | 21,600 | 29,300 |

E = according to the invention
Synthetic paraffin wax: SASOLWAX ® H1 (Sasol)
Metallocene-catalyzed PP, MFI 2000: L-Modu ™ S400 (Idemitsu Kosan Co., Ltd.), softening point 90° C., $M_n$ 45,000
Metallocene-catalyzed PP, MFI 350: L-Modu ™ S600 (Idemitsu Kosan Co., Ltd.), softening point 100° C., $M_n$ 70,000
Metallocene-catalyzed PP, MFI 50: L-Modu ™ S901 (Idemitsu Kosan Co., Ltd.), softening point 120° C., $M_n$ 120,000

Example 2: Rheological Testing

The rheological properties of formulation E3 according to the invention from Example 1 (denoted in FIG. 1 as DM 2900+6% protector according to the invention) were subsequently compared to those of the conventional formulation from Example 1 (denoted in FIG. 1 as DM 2900+6% old protector). For this purpose, in each case 6% by weight of the film-forming composition was added to a commercially available hot melt adhesive (Technomelt® DM2900, Henkel AG), and the storage modulus G', i.e., the ratio of the loss modulus (viscous modulus) to the memory modulus (elastic modulus), was determined as the loss factor (tan $\Delta$).

The results of these measurements are illustrated in FIG. 1. The results clearly show that use of the film-forming compositions according to the invention results in no impairment of the processability of the hot melt adhesive compared to the coating materials used heretofore. In particular, it was possible to process (spray) the hot melt adhesive at the same temperature as that when the film-forming composition is omitted, whereas for the known coating formulation, an increase in temperature by approximately 20° C. was necessary to ensure sprayability.

These rheological tests were corroborated by field tests. It was likewise confirmed by field tests that the novel cover material has no adverse effect on other important adhesive parameters, in particular the adhesive properties.

The invention claimed is:

1. A hot melt adhesive in the form of a pellet, comprising:
   (1) a core made of a hot melt adhesive having a softening point of 65 to 140° C., containing at least one polyolefin and at least one tackifying resin; and
   (2) a film made of a polymer composition, which essentially completely coats the core and is nontacky at a temperature of 20° C. to 60° C.,
   wherein the polymer composition, based on its total weight, comprises:
   a) 13 to 17% by weight, of at least one Fischer-Tropsch wax having a melting point of >95° C.;
   b) 55 to 65% by weight, of a first metallocene-catalyzed polypropylene homopolymer, having a softening point → of more than 95° C. to 100° C., a melt flow index (MFI) (230° C., 2.16 kg) of ≤1000 g/10 minutes and ≥300 g/10 minutes and a number average molecular weight of 70,000 to less than 100,000 g/mol;
   c) 22 to 27% by weight, of a second metallocene-catalyzed polypropylene homopolymer, having a softening point → of more than 85° C. to 90° C., a melt flow index (MFI) (230° C., 2.16 kg) of → more than 1000 g/10 minutes to 2000 g/10 minutes and a number average molecular weight of less than 50,000 g/mol; and
   d) 0.5 to 2% by weight, of an antioxidant agent,
   wherein the melting point of the polymer composition is ≤130° C.

2. The hot melt adhesive according to claim 1, characterized in that the pellets
   (1) each have a weight of less than 15 g; and/or
   (2) have a diameter of less than 25 mm in any dimension; and/or
   (3) have a cylindrical, spherical, or pillow-like shape; and/or
   (4) are produced by coextrusion of the core and the film made of the polymer composition.

3. The hot melt adhesive according to claim 1, characterized in that
   a) the film made of the polymer composition has a thickness of 2 to 200 µm; and/or
   b) the hot melt adhesive contains the shell material in a quantity of less than 12% by weight, based on the total weight of the hot melt adhesive.

4. The hot melt adhesive according to claim 1, characterized in that the at least one tackifying resin consists of a completely or partially hydrogenated hydrocarbon resin, a natural resin based on a colophony resin, a tall resin, or a pentaerythrol or a glycerol ester thereof.

5. The hot melt adhesive according to claim 1, characterized in that
   a) the pellets are nontacky at a temperature in the range of 20 to 60° C.; and/or
   b) the pellets form a homogeneous mixture in the molten state.

6. The hot melt adhesive in the form of pellets according to claim 1, which is a contact adhesive.

* * * * *